(12) United States Patent
Fujino et al.

(10) Patent No.: US 10,254,543 B2
(45) Date of Patent: Apr. 9, 2019

(54) IMAGE PROCESSING APPARATUS, IMAGE PROCESSING SYSTEM, CONTROL METHOD FOR IMAGE PROCESSING APPARATUS, AND NON-TRANSITORY COMPUTER-READABLE STORAGE MEDIUM FOR MIXED REALITY

(71) Applicant: CANON KABUSHIKI KAISHA, Tokyo (JP)

(72) Inventors: Reiko Fujino, Kawasaki (JP); Saku Hiwatashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 14/884,999

(22) Filed: Oct. 16, 2015

(65) Prior Publication Data

US 2016/0116737 A1  Apr. 28, 2016

(30) Foreign Application Priority Data

Oct. 23, 2014 (JP) .................................. 2014-216630

(51) Int. Cl.
*G02B 27/01* (2006.01)
*G06T 7/00* (2017.01)
(Continued)

(52) U.S. Cl.
CPC ....... *G02B 27/017* (2013.01); *G06K 9/00671* (2013.01); *G06K 9/4604* (2013.01);
(Continued)

(58) Field of Classification Search
CPC .......... G02B 27/017; G02B 2027/0112; G02B 2027/0134; G02B 2027/0138; G02B 2027/0141; H04N 19/597; G06T 7/97; G06T 7/00; G06T 9/00; G06T 2207/10012; G06F 3/00; G06K 9/00671; G06K 9/4604
(Continued)

(56) References Cited

U.S. PATENT DOCUMENTS

| 2007/0223811 A1* | 9/2007 | Kudo | G06F 17/3025 |
| | | | 382/162 |
| 2009/0110241 A1* | 4/2009 | Takemoto | G06K 9/32 |
| | | | 382/103 |
| 2015/0161476 A1* | 6/2015 | Kurz | G06K 9/4671 |
| | | | 382/190 |

FOREIGN PATENT DOCUMENTS

| JP | 2004-120201 A | 4/2004 | |
| JP | 2004120201 A | * 4/2004 | ......... H04N 1/00307 |

* cited by examiner

*Primary Examiner* — Nguyen T Truong
*Assistant Examiner* — Ayman A Abaza
(74) *Attorney, Agent, or Firm* — Carter, DeLuca & Farrell LLP

(57) ABSTRACT

An image processing apparatus includes an image capturing unit configured to capture a real space, a detection unit configured to detect, from image data captured by the image capturing unit, feature points to be used to obtain a position and an orientation of the image capturing unit, a generation unit configured to generate compressed image data by compressing a data amount of the image data, a transmission unit configured to transmit, to an external server, the compressed image data and position information of the feature points detected by the detection unit, and a display unit configured to display composite image data generated in the external server based on the position information and the compressed image data by receiving the composite image data from the external server.

11 Claims, 10 Drawing Sheets

(51) Int. Cl.
    *G06T 9/00*       (2006.01)
    *H04N 19/597*    (2014.01)
    *G06K 9/00*       (2006.01)
    *G06K 9/46*       (2006.01)

(52) U.S. Cl.
    CPC .................. *G06T 7/00* (2013.01); *G06T 7/97* (2017.01); *G06T 9/00* (2013.01); *H04N 19/597* (2014.11); *G02B 2027/0112* (2013.01); *G02B 2027/0134* (2013.01); *G02B 2027/0138* (2013.01); *G02B 2027/0141* (2013.01); *G06T 2207/10012* (2013.01); *G06T 2207/30244* (2013.01)

(58) Field of Classification Search
    USPC ..................................................... 375/240.08
    See application file for complete search history.

F I G. 1
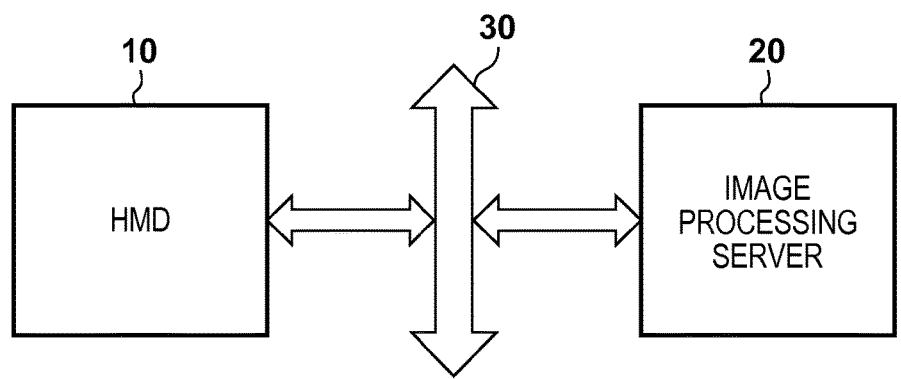

FIG. 6A

| i | 4 | 3 | 2 | 1 | 0 |
|---|---|---|---|---|---|
| LUMINANCE VALUE OF START POINT OF LINE SEGMENT i | 220 | 51 | 72 | 60 | 64 |
| LUMINANCE VALUE OF END POINT OF LINE SEGMENT i | 210 | 120 | 72 | 61 | 54 |
| DETERMINATION VALUE | 0 | 1 | 0 | 1 | 0 |

FIG. 6B

| i | 4 | 3 | 2 | 1 | 0 |
|---|---|---|---|---|---|
| TARGET FEATURE AMOUNT Xi OF STANDARD IMAGE | 0 | 1 | 0 | 1 | 0 |
| FEATURE AMOUNT Yi OF REFERENCE IMAGE | 1 | 1 | 0 | 0 | 0 |
| xor (Xi, Yi) | 1 | 0 | 0 | 1 | 0 |

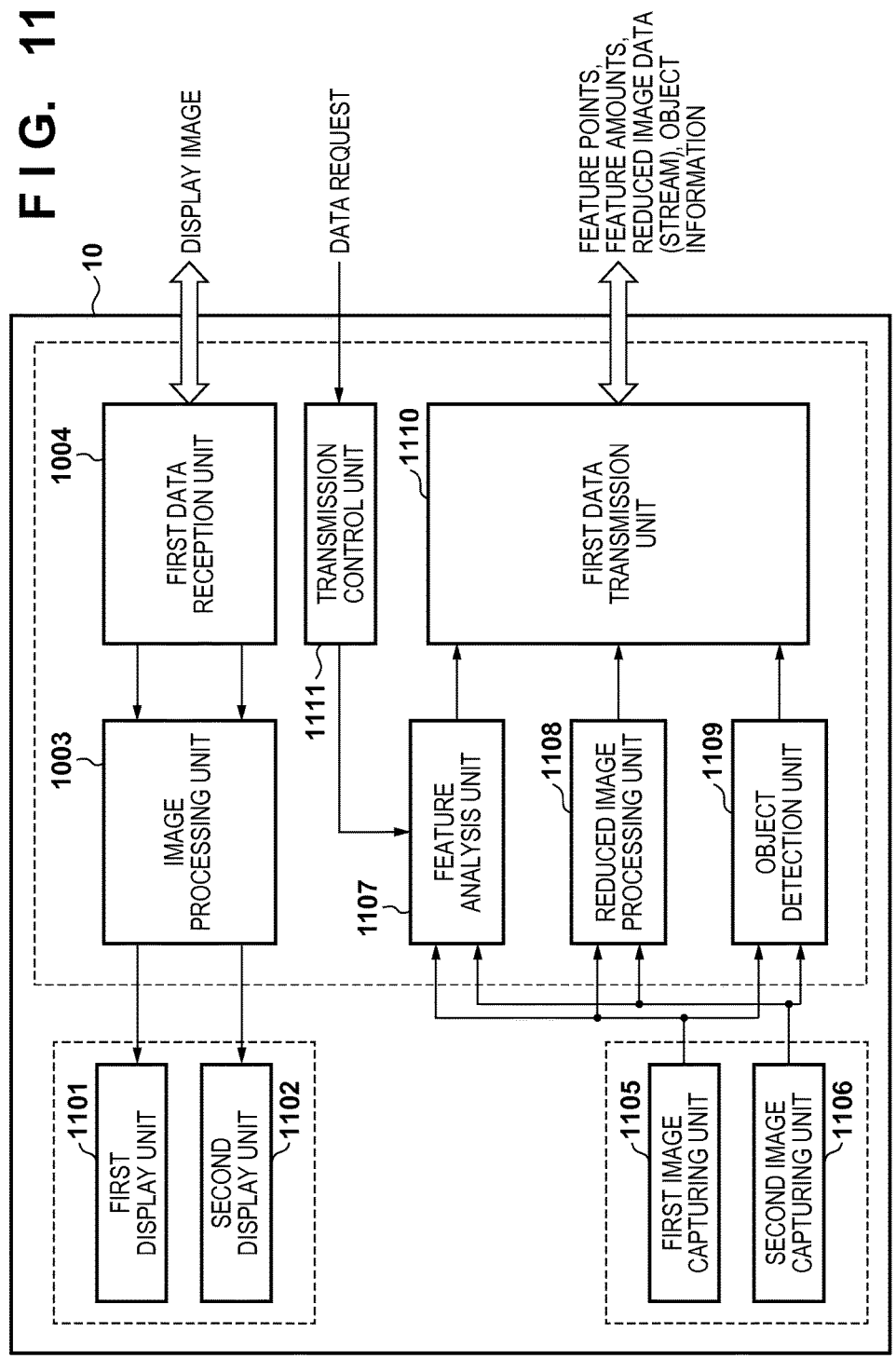

IMAGE PROCESSING APPARATUS, IMAGE PROCESSING SYSTEM, CONTROL METHOD FOR IMAGE PROCESSING APPARATUS, AND NON-TRANSITORY COMPUTER-READABLE STORAGE MEDIUM FOR MIXED REALITY

BACKGROUND OF THE INVENTION

Field of the Invention

The present invention relates to an image processing apparatus, an image processing system, a control method for the image processing apparatus, and a non-transitory computer-readable storage medium and, more particularly, to a virtual reality technology and mixed reality technology which use an HMD (Head Mounted Display).

Description of the Related Art

In recent years, as a technique for seamlessly merging a real world and virtual world in real time, so-called MR (Mixed Reality) techniques are known. As one of the MR techniques, a technique which uses a video see-through HMD (Head Mounted Display) is known. This is a system in which a video camera or the like captures an object, that nearly coincides with that viewed from a pupil position of an HMD user, and the HMD user can view an image obtained by superimposing CG (Computer Graphics) on the captured image.

This system is formed by an HMD for capturing an external world and displaying the image to the user, and an image processing apparatus for generating an image by superimposing CG on the captured image. To experience an MR space using the HMD while freely moving, the HMD and an external apparatus such as a PC preferably perform communication by wireless transmission. In general, however, the communication band of wireless communication is narrower than that of wired communication, and wireless communication is thus unstable.

To solve this problem, Japanese Patent Laid-Open No. 2004-120201 discloses a technique of enabling stable transmission of image data by changing the compressibility of an image in accordance with the status of a communication network to adjust a data amount in addition to compression and transmission of image data.

In wireless transmission between an HMD and an external apparatus, an image captured by the HMD is transmitted to the external apparatus, and the external apparatus measures a position and orientation, thereby performing image composition. In this case, to suppress the network transmission amount of image data from the HMD to the external apparatus, the image data is compressed by the HMD, and a coded stream is transmitted to the external apparatus. Upon receiving the coded stream transmitted from the HMD, the external apparatus decompresses the coded stream, performs image analysis using the decompressed image, and then measures a position and orientation based on image analysis information. Upon completion of measurement of the position and orientation, the external apparatus performs image composition using the decompressed image, and transmits the composite image to the HMD for display on the HMD.

In the technique described in Japanese Patent Laid-Open No. 2004-120201, however, when an external apparatus performs all calculation operations associated with measurement of a position and orientation, a coded stream obtained by compressing image data is used. Consequently, decompressed image data degrades as compared with image data obtained at the time of image capturing, and a calculation operation such as position and orientation measurement processing of the succeeding stage is performed using the degraded image data, thereby making it impossible to obtain sufficient calculation accuracy.

The present invention has been made in consideration of the above problem, and provides a technique of controlling data transmission while maintaining the calculation accuracy of processing of the succeeding stage.

SUMMARY OF THE INVENTION

According to one aspect of the present invention, there is provided an image processing apparatus comprising: an image capturing unit configured to capture a real space; a detection unit configured to detect, from image data captured by the image capturing unit, feature points to be used to obtain a position and orientation of the image capturing unit; a generation unit configured to generate compressed image data by compressing a data amount of the image data; a transmission unit configured to transmit, to an external server, the compressed image data and position information of the feature points detected by the detection unit; and a display unit configured to display composite image data generated in the external server based on the position information and the compressed image data by receiving the composite image data from the external server.

Further features of the present invention will become apparent from the following description of exemplary embodiments with reference to the attached drawings.

BRIEF DESCRIPTION OF THE DRAWINGS

FIG. 1 a view showing an example of the configuration of an image processing system according to an embodiment of the present invention;

FIG. 6A is a table showing the relationship between a determination value and a start point pixel value and end point pixel value;

FIG. 6B is a table showing an example of an XOR of bit strings between the target feature amount of a standard image and the feature amount of a reference image;

FIG. 11 is a functional block diagram showing an image processing apparatus (HDM) according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<1. Configuration of Image Processing System>

An image processing system to which MR (Mixed Reality) processing (position and orientation measurement processing) is applied according to an embodiment of the present invention will be described. As shown in FIG. 1, the image processing system includes an HMD (Head Mounted Display) 10 (image processing apparatus) and an external server 20. The HMD 10 and the external server 20 are interconnected via a network 30. The HMD 10 according to this embodiment controls a transmission order to the external server as a transmission destination by detecting feature points from two or more image data having different parallaxes, extracting feature amounts from the detected feature points, and setting a data transmission priority based on the feature amounts. In accordance with the use band of the network, the data transmission amount of the feature points and feature amounts is controlled.

An image to be displayed and information about the image are transmitted from the external server 20 to the network 30. The HMD 10 receives, via the network 30, the display image having undergone image processing in the external server 20.

<2. Arrangement of Image Processing Apparatus (HMD)>

Figure 2:
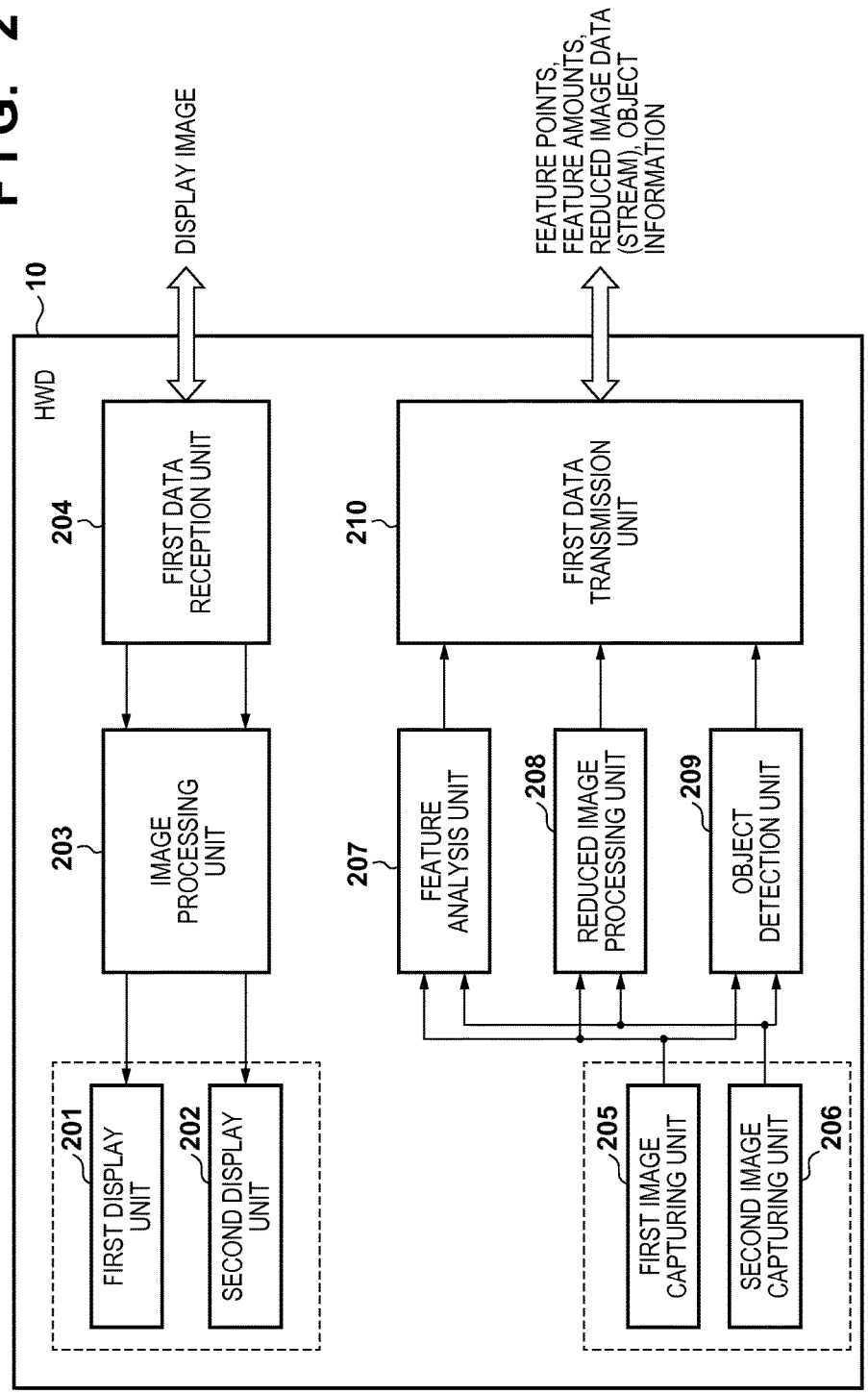
FIG. 2 is a functional block diagram showing an image processing apparatus (HMD) according to the first embodiment.

FIG. 2 is a functional block diagram showing the image processing apparatus (HMD 10) according to the first embodiment. The HMD 10 includes a first display unit 201, a second display unit 202, an image processing unit 203, a first data reception unit 204, a first image capturing unit 205, a second image capturing unit 206, a feature analysis unit 207, a reduced image processing unit 208, an object detection unit 209, and a first data transmission unit 210.

The first data reception unit 204 receives image data from the external server 20 via the network 30. The image processing unit 203 performs image processing on the image data for image display. Stereo images processed by the image processing unit 203 are respectively displayed on the first display unit 201 and the second display unit 202.

The first image capturing unit 205 and the second image capturing unit 206 perform stereo shooting of the external world of the HMD 10 instead of right and left eyes. Each of the first image capturing unit 205 and the second image capturing unit 206 performs development processing for an image captured by an optical element, and outputs the resultant image to the feature analysis unit 207, reduced image processing unit 208, and object detection unit 209.

The feature analysis unit 207 obtains the images output from the first image capturing unit 205 and second image capturing unit 206. The feature analysis unit 207 detects feature points from the obtained images (obtains position information), and extracts feature amounts corresponding to the feature points. The feature analysis unit 207 then determines the similarity of the feature points between the respective images corresponding to the right and left eyes to set the priorities of the feature points, and preferentially outputs data of a feature point having a higher priority to the first data transmission unit 210. Detailed processing of the feature analysis unit 207 will be described later with reference to FIG. 3.

The reduced image processing unit 208 reduces stereo videos input from the first image capturing unit 205 and second image capturing unit 206, and outputs the reduced videos to the first data transmission unit 210. Since the data amount of video data is large, there is provided a method of performing data compression using video coding processing such as H.264 or HEVC (High Efficiency Video Coding) and outputting a video coded stream. In this case, there is also provided a method of compressing a stereo video at a low bit rate by using video coding processing using parallax information such as MVC (Multiview Video Coding) but a reduced image compression algorithm is not limited to this. In this embodiment, there has been described a method of reducing or compressing an image to suppress an image data amount transmitted to the network 30. The present invention, however, is not limited to this. When the present invention is applied to wireless MR, image data necessary for position and orientation measurement or image composition in the external server 20 need only be transmitted from the HMD 10.

The object detection unit 209 detects, as object information, humans, objects, object colors, shapes, textures, and the like from the stereo videos obtained from the first image capturing unit 205 and second image capturing unit 206, and outputs the object information to the first data transmission unit 210.

The first data transmission unit 210 sends, to the network 30 shown in FIG. 1, the position information of the feature points and the feature amounts, which have been obtained from the feature analysis unit 207. Furthermore, the first data transmission unit 210 sends, to the network 30, the video coded stream obtained from the reduced image processing unit 208 and the object information obtained from the object detection unit 209. The external server 20 receives the data sent to the network 30.

<3. Arrangement of Feature Analysis Unit of Image Processing Apparatus (HMD)>

Figure 3:
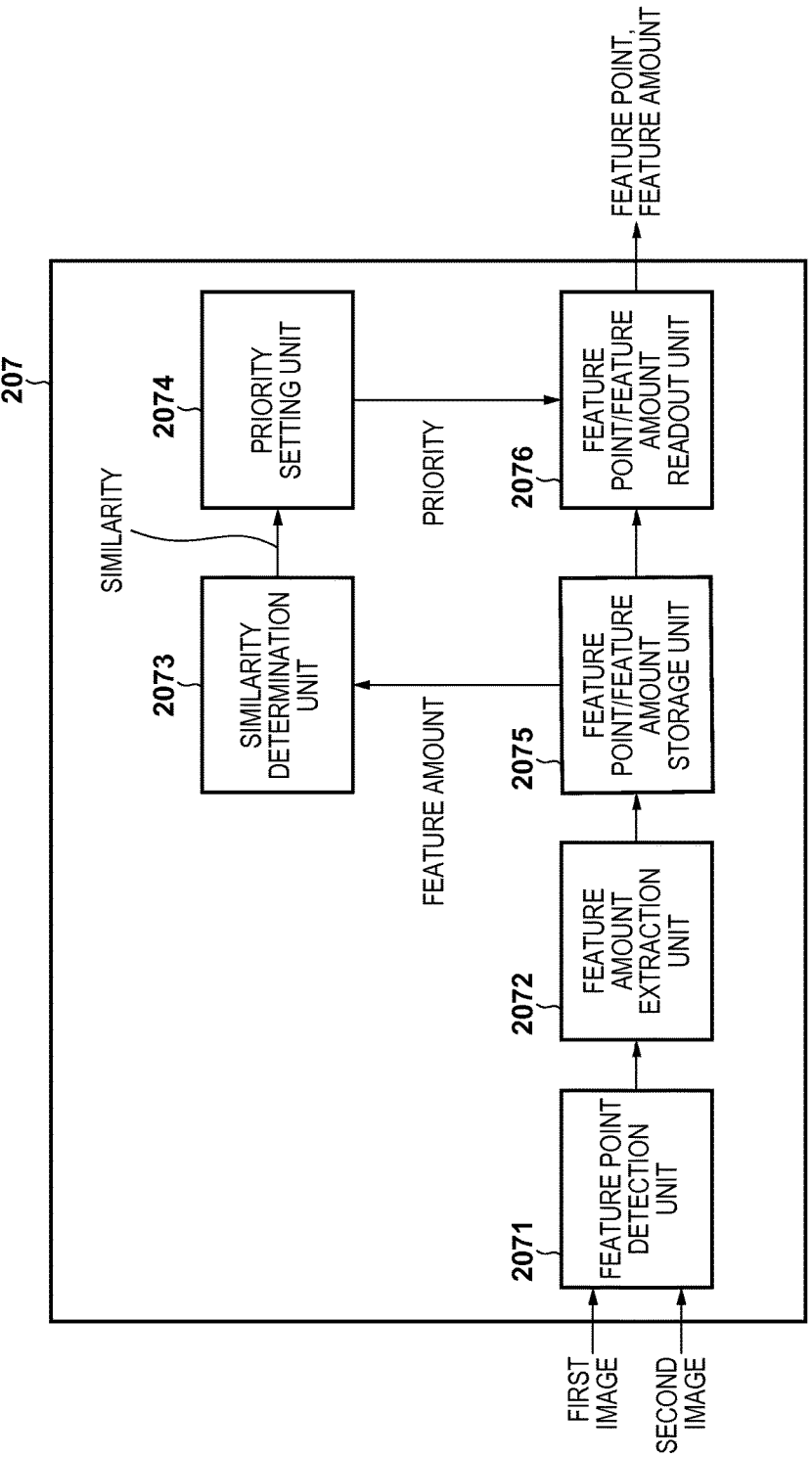
FIG. 3 is a functional block diagram showing a feature analysis unit according to the first embodiment.

The processing of the feature analysis unit 207 will be described in detail. FIG. 3 is a functional block diagram showing the feature analysis unit 207 according to the first embodiment. The feature analysis unit 207 includes a feature point detection unit 2071, a feature amount extraction unit 2072, a similarity determination unit 2073, a priority setting unit 2074, a feature point/feature amount storage unit 2075, and a feature point/feature amount readout unit 2076.

Figure 4:
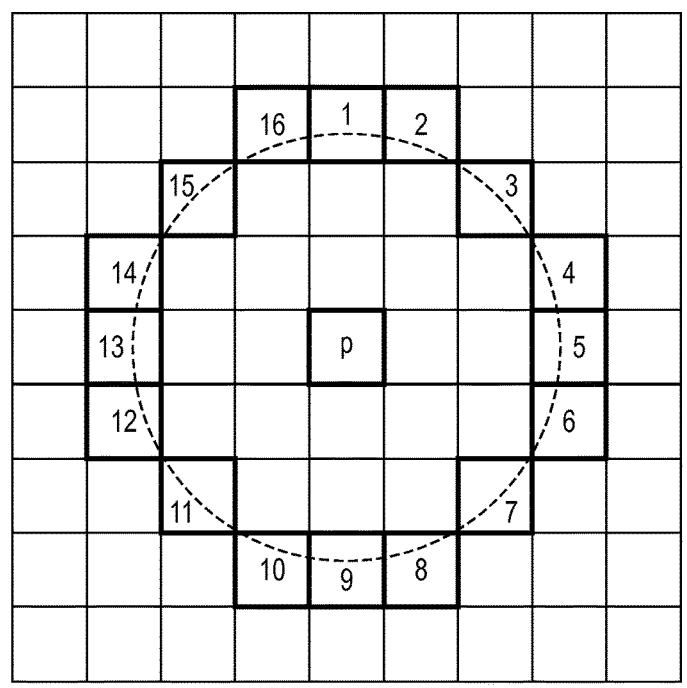
FIG. 4 is a view showing the positional relationship between a pixel of interest and reference pixels used for feature point detection according to the first embodiment.

The feature point detection unit 2071 detects the position information of a feature point from a pixel of interest and reference pixels in each of the obtained stereo images. FIG. 4 is a view showing the positional relationship between the pixel of interest and the reference pixels used for feature point detection according to the first embodiment. In this embodiment, luminances are used for feature point detection. A plurality of pixels circumferentially arranged at a predetermined distance around the center of a pixel Tp of interest positioned at a coordinate point p (p(x, y)) are used as reference pixels. FIG. 4 shows examples of the reference pixels when the distance from the pixel Tp of interest is set to 3. Peripheral pixels 1 to 16 are used as reference pixels. Note that the pixel of interest may be an interpolated pixel using the average value of pixels within a rectangular region or a value after filter processing.

If a score (index value) is calculated based on the differences between the pixel Tp of interest and the reference pixels, and the calculated score is equal to or larger than a threshold, it is determined that there is a three-dimensional structure in a region of interest. A method of calculating the score of the pixel Tp of interest will be explained next.

Among the circumferentially arranged reference pixels, a group of adjacent reference pixels is set as an arc to evaluate a feature amount. For example, a feature amount is evaluated while shifting the reference pixels by one, like an arc of reference pixels 4 to 12, an arc of reference pixels 5 to 13, and an arc of reference pixels 6 to 14. The sum of the differences between the pixel Tp of interest and its peripheral pixels forming each divided arc is compared with the threshold, and the score of the feature amount is determined.

If the number of peripheral pixels having a difference from the pixel Tp of interest which is equal to or larger than the threshold is large, the score of the feature amount is high. If the number of peripheral pixels having a difference from the pixel Tp of interest which is equal to or larger than the threshold is small, the score of the feature amount is low. The minimum value and maximum value of the score can be adjusted. Furthermore, a largest one of the scores of the feature amounts of the respective arcs is set as the score of the pixel Tp of interest, that is, the score of a feature point P. The feature point detected by the feature point detection unit 2071 is stored in the feature point/feature amount storage unit 2075.

Figure 5:
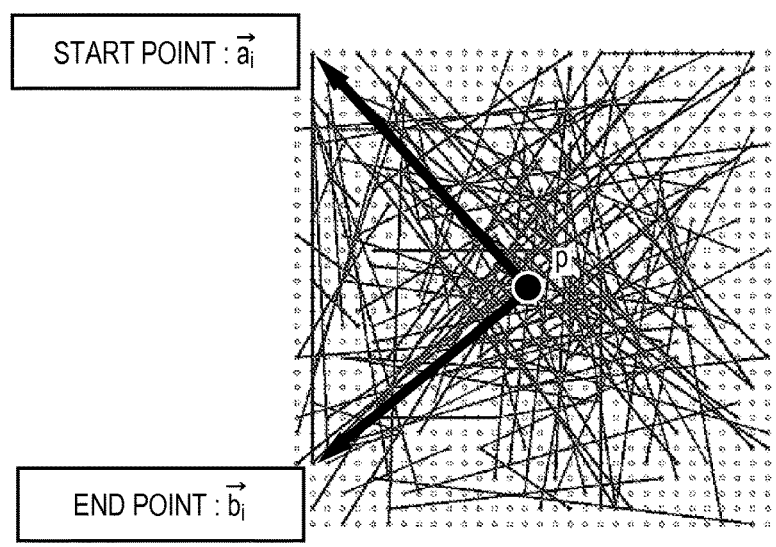
FIG. 5 is a view showing random lines and vectors which are used for feature amount extraction according to the first embodiment.

The feature amount extraction unit 2072 extracts a feature amount using coordinate information of the feature point detected by the feature point detection unit 2071. A practical feature amount calculation method will be described below. As shown in FIG. 5, lines are randomly arranged around the feature point P. Then, a feature amount is obtained by representing the magnitude relationships between the start point pixels and end point pixels of the random lines by a bit pattern.

$$\tau(p; \vec{a}, \vec{b}) := \begin{cases} 1 & I(p + \vec{a}) < I(p + \vec{b}) \\ 0 & I(p + \vec{a}) \geq I(p + \vec{b}) \end{cases} \quad (1)$$

A method of calculating a determination value based on the luminance values of the start point pixel and end point pixel of each random line will be explained using a random line determination expression indicated by expression (1) above. In expression (1), p represents the coordinate point of the feature point to be processed, $\vec{a}$ represents a vector indicating the start point of the ith random line, and $\vec{b}$ represents a vector indicating the end point of the ith random line. Furthermore, I(p) represents the pixel value of the coordinate point p of the feature point in an image I, and τ represents a determination value.

I(p+a) represents the pixel value of the start point position of the random line, and I(p+b) represents the pixel value of the end point position of the random line. The determination value τ is binary, that is, 0 or 1. According to expression (1), if the start point pixel value I(p+a) is smaller than the end point pixel value I(p+b), the determination value τ is 1. If the start point pixel value I(p+a) is equal to or larger than the end point pixel value I(p+b), the determination value τ is 0.

FIG. 6A is a table showing the relationship between the determination value and the luminance values of the start point pixel and end point pixel of the random line i. In this example, assume that the number of random lines is five for the sake of simplicity. When expression (1) is used, the determination values of the first (i=1) and third (i=3) random lines are 1 and the determination values of the 0th (i=0), second (i=2), and fourth (i=4) random lines are 0.

The feature amount of the feature point P is obtained by using the determination values of the random lines i (i=0 to 4) as a bit pattern. In the above-described table, the bit pattern of the feature amount of the feature point P is "01010". Note that it has been assumed that the number of random lines is five but the number of random lines is not limited to this. The number of random lines may be decreased or increased in accordance with a calculation resource. Note that if the number of random lines is decreased, the calculation accuracy of the feature amount may degrade. Alternatively, even if the number of random lines is increased to a given value or more, the redundancy may be increased, thereby disabling the accuracy improvement.

The feature amount extracted by the feature amount extraction unit 2072 is stored in the feature point/feature amount storage unit 2075, and output to the similarity determination unit 2073. Note that a feature point detection method and feature amount extraction method are not limited to the above-described ones. Although FAST (Features from Accelerated Segment Test) is a widely known method, for example, SIFT (Scale-Invariant Feature Transform) or ORB (Oriented FAST and Rotated BRIEF (Binary Robust Independent Elementary Features)) can be used.

The similarity determination unit 2073 determines the similarity of the feature points between the right and left image data by using the feature amounts extracted for the right and left images. One image out of the stereo images is set as a standard image, and corresponding feature point candidates are extracted from the other image (reference image) as a comparison target based on the coordinate point of the feature point extracted in the standard image. An extraction method will be described later. The feature amount of the feature point extracted from the standard image is compared with that of the feature point extracted from the reference image. If the similarity of the feature amounts is high, it is determined that the feature points indicate the same portion at high probability.

The feature point candidate extraction method will be described. Since the right and left images have parallaxes, feature points distributed in the reference image within a predetermined distance from the same coordinate point as that of the target feature point of the standard image are set as feature point candidates of similarity determination targets. For example, feature points of the reference image, which are distributed concentrically from the coordinate point of the target feature point of the standard image, may be set as determination target feature point candidates, or feature points of the reference image, which are distributed within a rectangular region moved by a predetermined distance from the coordinate point of the target feature point, may be set as determination target feature point candidates.

The similarity determination method will be described in detail. FIG. 6B is a table showing an example of an XOR of bit strings between the target feature amount in the standard image and the feature amount in the reference image. The similarity can be calculated based on a Hamming distance obtained by XORing the bit strings between a target feature amount Xi in the standard image and a feature amount Yi in the reference image, and counting is of the bit string. In the example shown in FIG. 6B, the XOR is "10010" and the Hamming distance is "2". As the value of the Hamming distance is smaller (closer to zero), it can be determined that the features are more similar to each other.

Note that an example in which the Hamming distance is used to determine the similarity has been explained but other distance representation methods such as a Manhattan distance and Euclidean distance can be used to calculate the length (distance) of the difference between the feature amounts for determining the similarity. Note that a similarity determination method is not limited to the above-described one. It is possible to apply block matching such as SAD (Sum of Absolute Difference).

Figure 7:
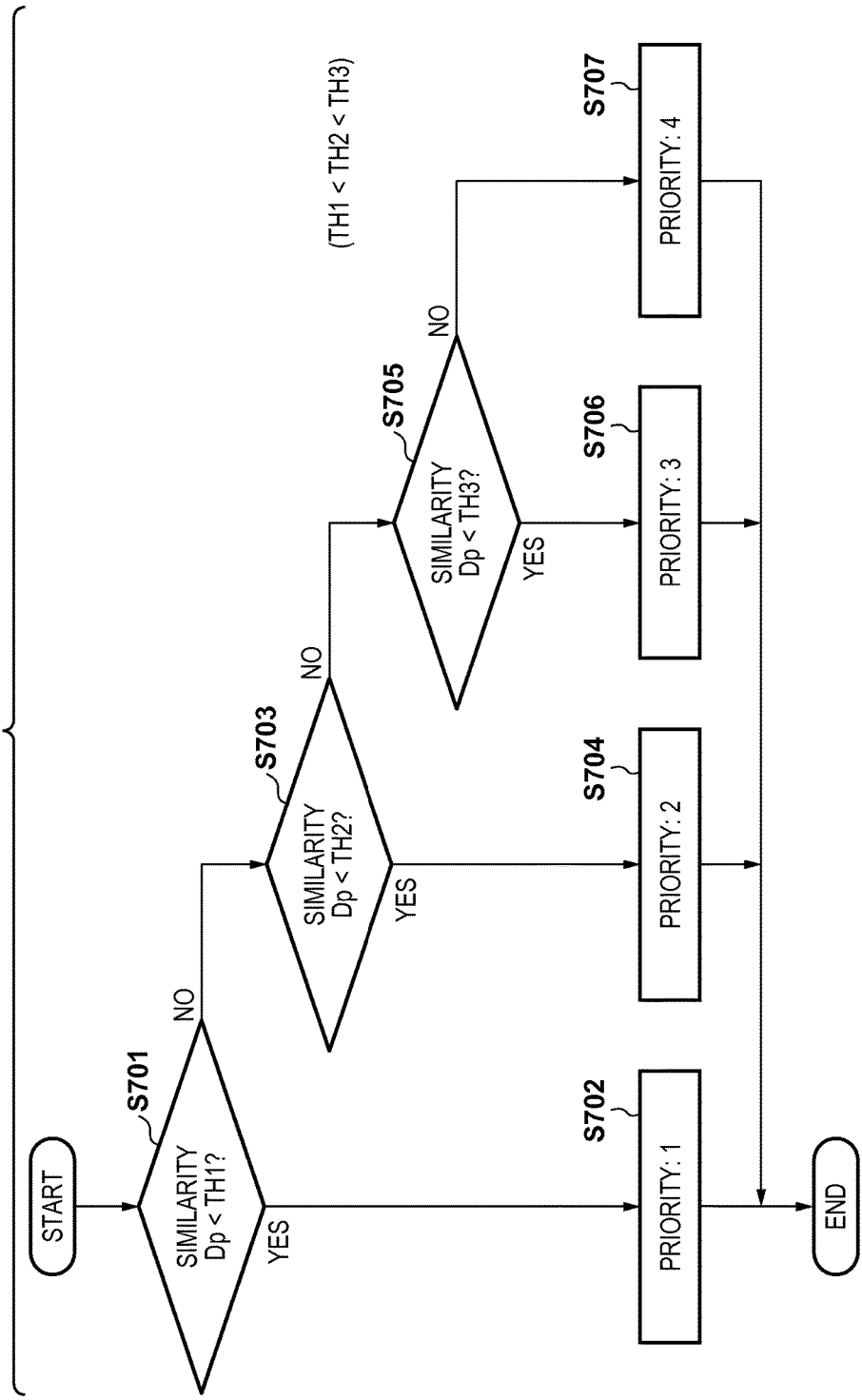
FIG. 7 is a flowchart illustrating a processing procedure performed by a priority setting unit according to the first embodiment.

The priority setting unit 2074 sets the priority of the feature point based on the similarity determined by the similarity determination unit 2073. A procedure of setting the data transmission order by the priority setting unit 2074 will be described with reference to a flowchart shown in FIG. 7. The processing shown in FIG. 7 is executed to set the priority at four stages of priorities 1 to 4 by using thresholds and the similarity determined by the similarity determination unit 2073.

In step S701, the priority setting unit 2074 compares the magnitude of a similarity Dp of the feature point P as a priority determination target with that of a first threshold TH1. If the similarity Dp is smaller than the first threshold TH1, the process advances to step S702; otherwise, the process advances to step S703.

In step S702, the priority setting unit 2074 sets the transmission priority of the feature point P to 1. In step S703, the priority setting unit 2074 compares the magnitude of the similarity Dp with that of a second threshold TH2. If the similarity Dp is smaller than the second threshold TH2, the process advances to step S704; otherwise, the process advances to step S705.

In step S704, the priority setting unit 2074 sets the transmission priority of the feature point P to 2. In step S705, the priority setting unit 2074 compares the magnitude of the similarity Dp with that of a third threshold TH3. If the similarity Dp is smaller than the third threshold TH3, the process advances to step S706; otherwise, the process advances to step S707. In step S706, the priority setting unit 2074 sets the transmission priority of the feature point P to 3. In step S707, the priority setting unit 2074 sets the transmission priority of the feature point P to 4.

Each process shown in FIG. 7 then ends. The thus determined priority and the feature point and feature amount may be stored in the feature point/feature amount storage unit 2075 in correspondence with each other.

Lastly, in accordance with the priority set by the priority setting unit 2074, the feature point/feature amount readout unit 2076 reads out the feature point and feature amount stored in the feature point/feature amount storage unit 2075, and outputs them to the outside (the first data transmission unit 210) of the feature analysis unit 207. All feature points and feature amounts which have been determined as priority 1 are output, and then feature points and feature amounts which have been determined as priority 2 are output. Then, feature points and feature amounts determined as priorities 3 and 4 are sequentially output. As described above, the feature analysis unit 207 sequentially outputs, to the first data transmission unit 210, feature points and feature amounts from those having a higher priority, and the first data transmission unit 210 sequentially transmits, to the network 30, the feature points and feature amounts obtained from the feature analysis unit 207.

Figure 8A:
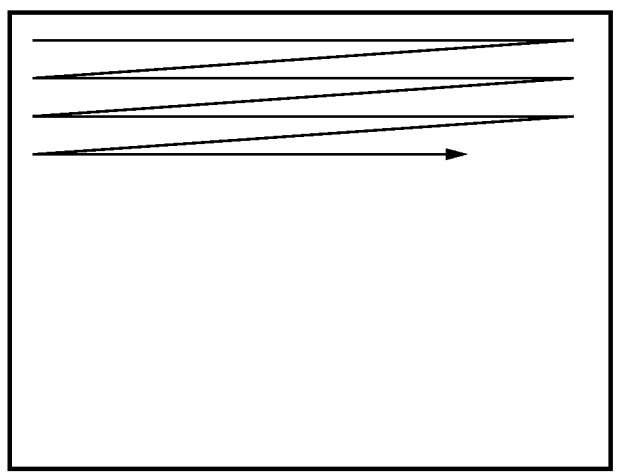
FIGS. 8A and 8B are views showing an example of an image scan order in feature point detection processing according to the first embodiment.
Figure 8B:
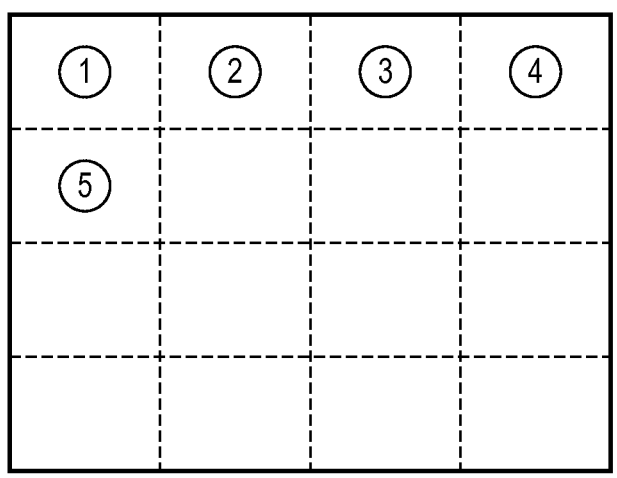

Note that feature point detection processing is generally processing complying with a raster scan order shown in FIG. 8A. Since, however, the similarity determination unit 2073 uses the feature amounts corresponding to the feature points in the right and left images, it is necessary to provide a memory for holding feature amounts corresponding to the feature points for one screen according to the method shown in FIG. 8A. Furthermore, in the method shown in FIG. 8A, a processing unit of the succeeding stage needs to stand by until completion of feature point detection processing for one screen. To cope with this, as shown in FIG. 8B, it is possible to divide an image into rectangular regions, raster-scan the rectangular regions, detect feature points, and determine the similarity. In the case of the scan order shown in FIG. 8B, it is possible to reduce the storage capacity of the feature point/feature amount storage unit 2075, and suppress a delay caused when the processing unit stands by until completion of feature point detection processing.

Note that the processing order described with reference to FIGS. 8A and 8B is an example of a feature point detection order. It is possible to arbitrarily or randomly scan the processing target regions of the image, and detect feature points.

<4. Arrangement of External Server>

Figure 9:
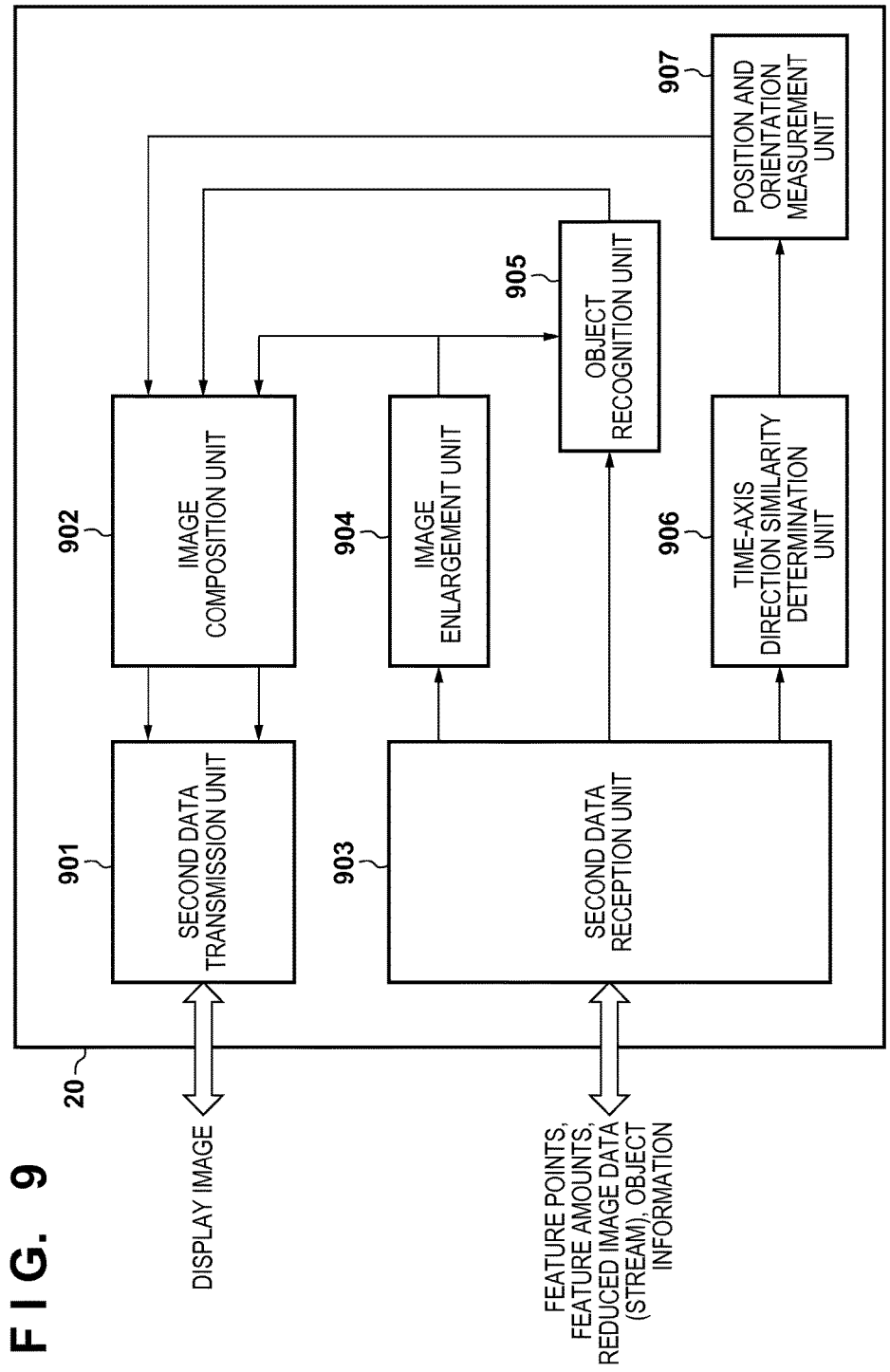
FIG. 9 is a functional block diagram showing an external server according to the first embodiment.

The functional arrangement of the external server 20 according to the first embodiment will be described with reference to FIG. 9. The external server 20 includes a second data transmission unit 901, an image composition unit 902, a second data reception unit 903, an image enlargement unit 904, an object recognition unit 905, a time-axis direction similarity determination unit 906, and a position and orientation measurement unit 907.

The second data reception unit 903 receives feature points, feature amounts, reduced images, and object information from the HMD 10 via the network 30. The image enlargement unit 904 decodes the reduced image received by the second data reception unit 903, and enlarges it to a desired image size. The object recognition unit 905 recognizes a moving object and user-designated attributes using the object information received by the second data reception unit 903 and the image enlarged by the image enlargement unit 904.

The time-axis direction similarity determination unit 906 determines the similarity between frames having different times by using the feature points and feature amounts received by the second data reception unit. The position and orientation measurement unit 907 measures a position and orientation using the similarity, feature points, and feature amounts, and outputs position and orientation information.

Based on the enlarged image generated by the image enlargement unit 904, the object information output from the object recognition unit 905, and the position and orientation information measured by the position and orientation measurement unit 907, the image composition unit 902 performs CG composition and outputs a composite image to the second data transmission unit 901. The second data transmission unit 901 outputs the composite image composited by the image composition unit 902 to the HMD 10 via the network 30.

In the HMD 10, the first data reception unit 204 shown in FIG. 2 receives image data from the external server 20 via the network 30. The image processing unit 203 performs image processing on the image data for image display. Stereo images processed by the image processing unit 203 are respectively displayed on the first display unit 201 and second display unit 202. An image drawing procedure in the MR processing according to the first embodiment has been described.

In this embodiment, stereo images having different parallaxes have been explained for the sake of simplicity. The present invention, however, may extract feature amounts between temporally different images having the same viewpoint. Furthermore, although a description has been provided using a video see-through type MR system in this embodiment, the present invention is not limited to this, and is applicable to, for example, an optical see-through type MR system.

As described above, according to this embodiment, it is possible to detect feature points and extract feature amounts corresponding to the feature points at high accuracy by performing, in the HMD (image processing apparatus) main body, calculation processing of detecting feature points to be used for position and orientation measurement and extracting feature amounts. Furthermore, transmission control of preferentially transmitting feature points necessary for matching in the time-axis direction, which is performed in the external server, can suppress the transmission band, and implement high-speed MR processing (position and orientation measurement processing).

As described above, it is possible to suppress the transmission data amount of the network while maintaining the calculation accuracy of MR processing (position and orientation measurement) by preferentially transmitting feature points having high similarity in stereo images.

Second Embodiment

Similarly to the first embodiment, in the second embodiment, an HMD main body detects feature points and extracts feature amounts in position and orientation measurement, and transmits the feature points and feature amounts to a network. An external server measures a position and orientation based on the feature points and feature amounts received via the network. Therefore, a description of the configuration of an image processing system will be omitted.

The functional arrangement of an image processing apparatus (HMD) according to the second embodiment will be described with reference to FIG. 10. A main difference from the first embodiment is that an HMD 10 according to the second embodiment further includes a transmission control unit 1011, and the processing of a feature analysis unit 1007 is different. Other processing units are the same as those shown in FIG. 2, and correspondences between the processing units will be explained below and a detailed description thereof will be omitted.

Figure 10:
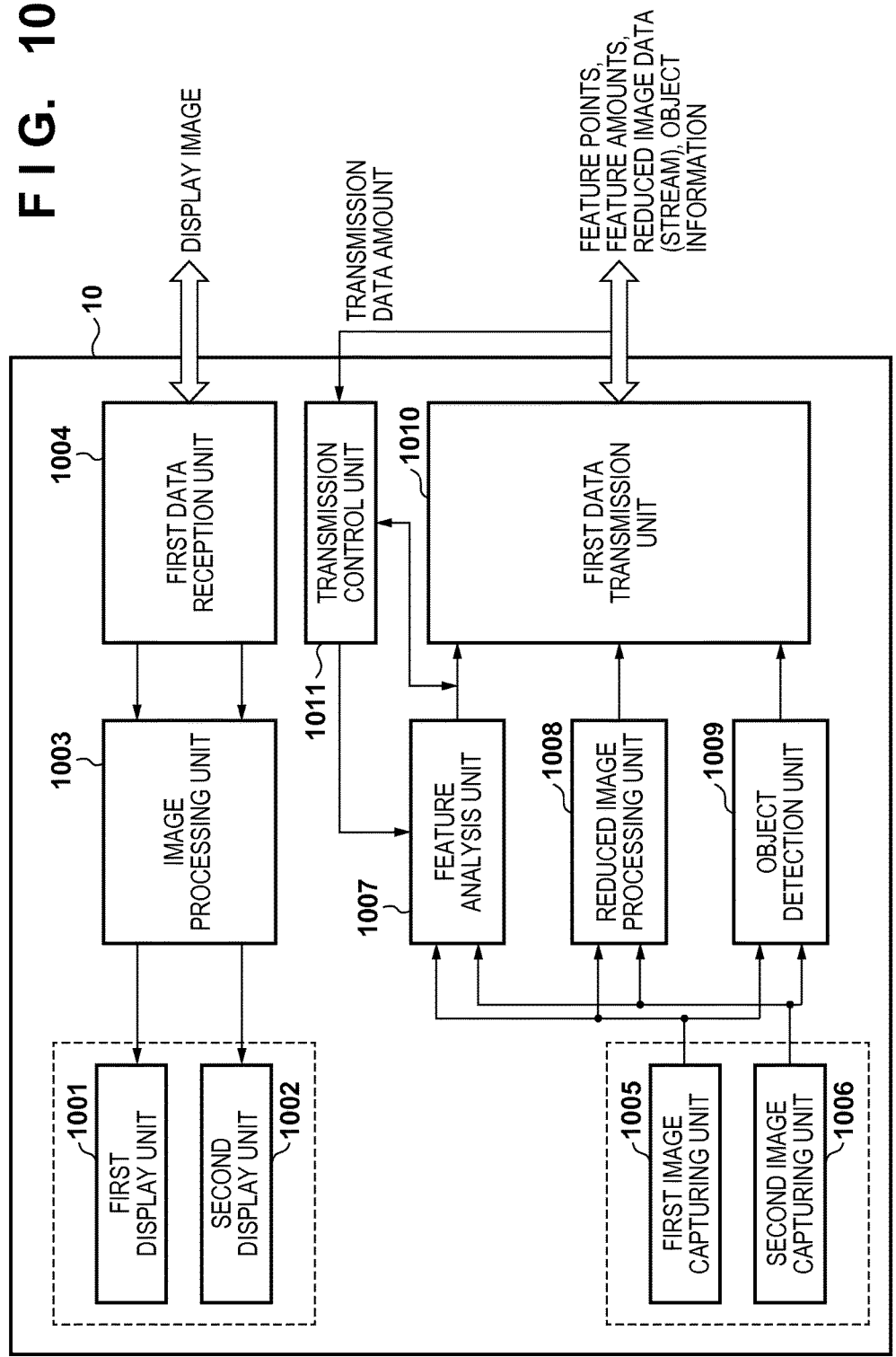
FIG. 10 is a functional block diagram showing an image processing apparatus (HDM) according to the second embodiment.

Referring to FIG. 10, a first data reception unit 1004 corresponds to the first data reception unit 204, an image processing unit 1003 corresponds to the image processing unit 203, a first display unit 1001 corresponds to the first display unit 201, and a second display unit 1002 corresponds to the second display unit 202. Furthermore, a first image capturing unit 1005 corresponds to the first image capturing unit 205, and a second image capturing unit 1006 corresponds to the second image capturing unit 206. In addition, a reduced image processing unit 1008 corresponds to the reduced image processing unit 208, an object detection unit 1009 corresponds to the object detection unit 209, and a first data transmission unit 1010 corresponds to the first data transmission unit 210.

The processing of the transmission control unit 1011 and that of the feature analysis unit 1007 according to this embodiment will be described below. The transmission control unit 1011 controls the transmission amount of reduced image data and that of data of feature points and feature amounts transmitted from the first data transmission unit 1010 to a network 30. Similarly to the feature analysis unit 207, the feature analysis unit 1007 detects feature points from stereo images, and extracts feature amounts. Furthermore, the feature analysis unit 1007 transmits the data of the feature points and feature amounts to the first data transmission unit 1010 only while an output stop instruction from the transmission control unit 1011 is canceled.

More specifically, the transmission control unit 1011 measures the transmission amount of the reduced image data transmitted from the first data transmission unit 1010 to the network. If the transmission amount of the reduced images transmitted from the first data transmission unit 1010 is larger than a predetermined threshold, the transmission control unit 1011 suppresses the transmission data amount of the first data transmission unit 1010 by suppressing the transmission amount of the data of the feature points and feature amounts output from the feature analysis unit 1007 to the first data transmission unit 1010.

Furthermore, the transmission control unit 1011 measures the transmission amount of the data of the feature points and feature amounts output from the feature analysis unit 1007 to the first data transmission unit 1010. If the measure transmission amount of the data of the feature points and feature amounts exceeds a predetermined threshold, the transmission control unit 1011 instructs the feature analysis unit 1007 to stop outputting the data of the feature points and feature amounts. On the other hand, if the data amount of the reduced images transmitted from the first data transmission unit 1010 is equal to or smaller than the threshold, the transmission control unit 1011 cancels the output stop instruction of the feature points and feature amounts output from the feature analysis unit 1007.

In addition, if the data amount transmitted to the network 30 reaches a usable band, the transmission control unit 1011 instructs the feature analysis unit 1007 to stop outputting the data.

As described above, according to the second embodiment, it is possible to keep unchanged the data amount transmitted from the HMD main body to the network, and implement high-speed position and orientation measurement.

Third Embodiment

In the third embodiment, the data amount of feature points and feature amounts to be transmitted from an HMD to a network is controlled by a method different from that in the second embodiment. The functional arrangement of an image processing apparatus (HMD) according to the third embodiment will be described below with reference to FIG. 11.

The difference between the arrangement of the HMD shown in FIG. 10 described in the second embodiment and that of the HMD shown in FIG. 11 will be explained. A main difference between FIGS. 10 and 11 is a difference in processing of a transmission control unit. Other processing units are the same as those in FIG. 10, and correspondences between the processing units shown in FIGS. 10 and 11 will be explained below and a detailed description of functions will be omitted.

Referring to FIG. 11, a first data reception unit 1104 corresponds to the first data reception unit 1004, an image processing unit 1103 corresponds to the image processing unit 1003, a first display unit 1101 corresponds to the first display unit 1001, and a second display unit 1102 corresponds to the second display unit 1002. Furthermore, a first image capturing unit 1105 corresponds to the first image capturing unit 1005 and a second image capturing unit 1106 corresponds to the second image capturing unit 1006. In addition, a reduced image processing unit 1108 corresponds to the reduced image processing unit 1008, an object detection unit 1109 corresponds to the object detection unit 1009, and a first data transmission unit 1110 corresponds to the first data transmission unit 1010.

A transmission control unit 1111 different from that in the second embodiment will be described below. The transmission control unit 1111 controls the data amount of feature points and feature amounts transmitted from the first data transmission unit 1110 to a network 30.

More specifically, based on a data request instruction from an external server 20 which receives the feature points and feature amounts via the network 30 shown in FIG. 1, the transmission control unit 1111 permits a feature analysis unit 1107 to transmit data of the feature points and feature amounts.

For example, if it is impossible to ensure the network reception band of the external server 20, the external server 20 temporarily stops a data request instruction to an HMD 10. If the data amount of images transmitted to the side of the HMD 10 becomes large, reception of the data of the feature amounts and feature points is temporarily stopped, and matching processing is continued based on information of feature amounts and feature points received in the past. Furthermore, if it is determined that the external server 20 has already obtained the necessary number of data of the feature points and feature amounts necessary to measure the position and orientation of an object in a virtual space, the external server 20 stops the data request instruction to the HMD 10.

While the external server 20 issues no data request instruction, the transmission control unit 1111 instructs the feature analysis unit 1107 to stop outputting the data of the feature points and feature amounts to the first data transmission unit 1110. On the other hand, upon receiving the data request instruction from the external server 20, the transmission control unit 1111 instructs the feature analysis unit 1107 to output the data of the feature points and feature amounts to the first data transmission unit 1110.

As described above, according to this embodiment, in accordance with the data reception status of the external server which receives the data of the feature points and feature amounts, it is possible to control the data amount of the feature points and feature amounts output from the HMD, thereby implementing high-speed position and orientation measurement.

According to the present invention, it is possible to control data transmission while maintaining the calculation accuracy of processing of the succeeding stage.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216630, filed Oct. 23, 2014, which is hereby incorporated by reference wherein in its entirety.

What is claimed is:

1. An image processing apparatus comprising:
   one or more first processors; and
   a first memory coupled to the one or more first processors and including first instructions stored thereon that, when executed by the one or more first processors, cause the image processing apparatus to function as:
   an image capturing unit configured to capture a real space;
   a detection unit configured to detect, from a plurality of image data captured by the image capturing unit, feature points to be used to obtain a position and an orientation of the image capturing unit;
   an extraction unit configured to extract each of feature amounts of the feature points detected by the detection unit;
   a generation unit configured to generate compressed image data by compressing a data amount of the image data;
   a transmission unit configured to transmit, to an external server, the compressed image data and data including position information of the feature points detected by the detection unit and the feature amounts extracted by the extraction unit; and
   a display unit configured to display composite image data generated in the external server based on the position information and the compressed image data by receiving the composite image data from the external server,
   wherein the image capturing unit captures a pair of images corresponding to right and left eyes, wherein the first instructions, when executed by the one or more first processors, further cause the image processing apparatus to function as:
   a determination unit configured to determine similarity of feature points between the pair of images based on the extracted feature amounts;
   a setting unit configured to set a transmission priority of data including the feature points and the feature amounts based on the similarity of the feature points; and
   a control unit configured to control a data amount transmitted by the transmission unit,
   wherein the transmission unit sequentially transmits the data including the position information of the feature points and the feature amounts in a descending order of the transmission priority of the feature points to the external server, and wherein the control unit measures a transmission amount of the compressed image data transmitted by the transmission unit and stops transmission of the data of the feature points and the feature amounts, when the transmission amount of the compressed image data exceeds a threshold.

2. The apparatus according to claim 1, wherein the first instructions, when executed by the one or more first processors, cause the image processing apparatus to function as:
a transmission control unit configured to control transmission of data by the transmission unit based on a data request instruction from the external server.

3. The apparatus according to claim 1, wherein the first instructions, when executed by the one or more processors, cause the image processing apparatus to further function as:
an object detection unit configured to detect object information from the image data,
wherein the transmission unit further transmits the object information.

4. The apparatus according to claim 1, wherein the image processing apparatus is a head mounted display.

5. An image processing system comprising:
the image processing apparatus defined in claim 1;
one or more second processors;
a second memory coupled to the one or more second processors and including second instructions stored thereon that, when executed by the one or more second processors, cause the image processing system to function as:
a deriving unit configured to derive position and orientation information of the image capturing unit based on position information of feature points transmitted from the image processing apparatus;
a virtual image data generation unit configured to generate virtual image data based on the position and orientation information derived by the deriving unit;
a composite image data generation unit configured to generate composite image data based on compressed image data and the virtual image data; and
the external server configured to transmit the composite image data to the image processing apparatus.

6. The system according to claim 5, wherein the external server includes a measurement unit configured to measure a position and an orientation of an object in a virtual space by matching, in a time-axis direction, the feature points received from the image processing apparatus.

7. A control method for an image processing apparatus, the method comprising:
detecting, from a plurality of image data captured by an image capturing unit configured to capture a real space, feature points to be used to obtain a position and an orientation of the image capturing unit;
extracting each of feature amounts of the detected feature points;
generating compressed image data by compressing a data amount of the image data;
transmitting, to an external server, the compressed image data and data including position information of the feature points detected in the detection step and the feature amounts extracted in the extraction step; and
displaying composite image data generated in the external server based on the position information and the compressed image data by receiving the composite image data from the external server,
wherein the image capturing unit captures a pair of images corresponding to left and right eyes,
wherein the control method further comprises:
determining similarity of feature points between the pair of images based on the extracted feature amounts; and
setting a transmission priority of data including the feature points and the feature amounts based on the similarity of the feature points; and
controlling a transmitted data amount,
wherein the data including the position information of the feature points and the feature amounts are sequentially transmitted to the external server in a descending order of the transmission priority of the feature points,
wherein a transmission amount of the compressed image data is measured, and
wherein transmission of the data of the feature points and the feature amounts is stopped if when the transmission amount of the compressed image data exceeds a threshold.

8. A non-transitory computer-readable storage medium storing a computer program for causing a computer to function as:
a detection unit configured to detect, from a plurality of image data captured by an image capturing unit configured to capture a real space, feature points to be used to obtain a position and an orientation of the image capturing unit;
an extraction unit configured to extract each of feature amounts of the feature points detected by the detection unit;
a generation unit configured to generate compressed image data by compressing a data amount of the image data;
a transmission unit configured to transmit, to an external server, the compressed image data and data including position information of the feature points detected by the detection unit and the feature amounts extracted by the extraction unit; and
a display unit configured to display composite image data generated in the external server based on the position information and the compressed image data by receiving the composite image data from the external server,
wherein the image capturing unit captures a pair of images corresponding to left and right eyes,
wherein the computer program further causes the computer to function as:
a determination unit configured to determine similarity of feature points between the pair of images based on the extracted feature amounts; and
a setting unit configured to set a transmission priority of data including the feature points and the feature amounts based on the similarity of the feature points; and
a control unit configured to control a data amount transmitted by the transmission unit,
wherein the transmission unit sequentially transmits to the external server the data including the position information of the feature points and the feature amounts in a descending order of the transmission priority of the feature points and wherein the control unit measures a transmission amount of the compressed image data transmitted by the transmission unit, and
wherein the control unit measures a transmission amount of the compressed image data transmitted by the transmission unit and stops transmission of the data of the feature points and the feature amounts, when the transmission amount of the compressed image data exceeds a threshold.

9. An image processing apparatus comprising:
one or more processors;
a memory coupled with the one or more processors and including instructions stored thereon that, when executed by the one or more processors, cause the image processing apparatus to function as:
  a detection unit configured to detect feature points from a pair of images corresponding to left and right eyes;
  an extraction unit configured to extract each of feature amounts of the feature points for the pair of images;
  a determination unit configured to determine similarity of the feature points between the pair of images based on the extracted feature amounts;
  a setting unit configured to set a transmission priority of data including position information of the feature points and the feature amounts based on the similarity of the feature points;
  a transmission unit configured to sequentially transmit the data in a descending order of the transmission priority of the feature points to an external server; and
  a control unit configured to control a data amount transmitted by the transmission unit,
  wherein the control unit measures a transmission amount of the data transmitted by the transmission unit and stops transmission of the data of the feature points and the feature amounts, when the transmission amount of the data exceeds a threshold.

10. A control method for an image processing apparatus, comprising:
  detecting feature points from a pair of images corresponding to left and right eyes;
  extracting each of feature amounts of the feature points for the pair of images;
  determining similarity of the feature points between the pair of images based on the extracted feature amounts;
  setting a transmission priority of data including position information of the feature points and the feature amounts based on the similarity of the feature points;
  sequentially transmitting the data in a descending order of the transmission priority of the feature points to an external server; and
  controlling a transmitted data amount,
  wherein a transmission amount of the data is measured, and
  wherein transmission of the data of the feature points and the feature amounts is stopped when the transmission amount of the data exceeds a threshold.

11. A non-transitory computer-readable storage medium storing a computer program for causing a computer to function as:
  a detection unit configured to detect feature points from a pair of images corresponding to left and right eyes;
  an extraction unit configured to extract each of feature amounts of the feature points for the pair of images;
  a determination unit configured to determine similarity of the feature points between the pair of images based on the extracted feature amounts;
  a setting unit configured to set a transmission priority of data including position information of the feature points and the feature amounts based on the similarity of the feature points;
  a transmission unit configured to sequentially transmit the data in a descending order of the transmission priority of feature points to an external server; and
  a control unit configured to control a data amount transmitted by the transmission unit,
  wherein the control unit measures a transmission amount of the data transmitted by the transmission unit and stops transmission of the data of the feature points and the feature amounts, when transmission amount of the data exceeds a threshold.

* * * * *